(12) United States Patent
Wang et al.

(10) Patent No.: US 11,748,436 B2
(45) Date of Patent: Sep. 5, 2023

(54) WEB SMART EXPLORATION AND MANAGEMENT IN BROWSER

(71) Applicant: International Business Machines Corporation, Armonk, NY (US)

(72) Inventors: Jun Wang, Xi'an (CN); Xue Ying Zhang, Xi'an (CN); Song Bo, Xi'an (CN); Dong Hai Yu, Xian (CN); Jing James Xu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/483,714

(22) Filed: Sep. 23, 2021

(65) Prior Publication Data

US 2023/0097330 A1    Mar. 30, 2023

(51) Int. Cl.
*G06F 16/957*     (2019.01)
*G06F 16/955*     (2019.01)
*G06F 16/9535*    (2019.01)

(52) U.S. Cl.
CPC ........ *G06F 16/9574* (2019.01); *G06F 16/955* (2019.01); *G06F 16/9535* (2019.01)

(58) Field of Classification Search
CPC . G06F 16/9574; G06F 16/9535; G06F 16/955
See application file for complete search history.

(56) References Cited

U.S. PATENT DOCUMENTS

| | | | |
|---|---|---|---|
| 8,191,007 B1 | 5/2012 | Veloz, III | |
| 9,203,905 B1* | 12/2015 | Hong | ...................... H04L 67/14 |
| 10,318,628 B2 | 6/2019 | Le Bescond De Coatpont | |
| 2011/0252057 A1* | 10/2011 | Huang | ................. G06F 16/2322 |
| | | | 707/E17.014 |
| 2012/0030182 A1* | 2/2012 | Claman | ................... G11B 27/34 |
| | | | 707/690 |
| 2013/0086506 A1 | 4/2013 | Molander | |
| 2016/0012052 A1* | 1/2016 | Zoryn | ............... G06F 16/24578 |
| | | | 707/728 |
| 2017/0199638 A1* | 7/2017 | Bhupatiraju | ........ G06F 16/9577 |
| 2017/0286525 A1* | 10/2017 | Li | ........................... G06N 20/00 |

(Continued)

OTHER PUBLICATIONS

Authors et al.: Disclosed Anonymously, "Method for organizing tabs for convenient navigation", An IP.com Prior Art Database Technical Disclosure, IP.com No. IPCOM000261781D, IP.com Electronic Publication Date: Apr. 3, 2020, 3 Pages.

*Primary Examiner* — Mariela Reyes
*Assistant Examiner* — Fatima P Mina
(74) *Attorney, Agent, or Firm* — Sonny Z. Zhan; Jared L. Montanaro

(57) ABSTRACT

In an approach for detecting web browsing subject-oriented event interactions and intelligently organizing web pages based on insights from important interactions for better exploration and efficient management, a processor extracts time series data associated with a plurality of web browsing events based on browsing historical actions of a user. A processor identifies the subject of each web browsing event. A processor determines major events based on the time series data and subjects of the plurality of web browsing events. A processor organizes the plurality of web browsing events based on subject hierarchy and timeline from the time series data. A processor highlights one or more uniform resource locators based on the subject hierarchy and timeline.

20 Claims, 7 Drawing Sheets

(56) References Cited

U.S. PATENT DOCUMENTS

2018/0321804 A1    11/2018  Motghare
2018/0365326 A1*   12/2018  Jiang ..................... G06F 16/282
2020/0151740 A1     5/2020  Martchenko
2021/0383252 A1*   12/2021  Arnold .................. G06N 20/00

* cited by examiner

WEB SMART EXPLORATION AND MANAGEMENT IN BROWSER

BACKGROUND

The present disclosure relates generally to the field of web browser exploration and management, and more particularly to detecting web browsing subject-oriented event interactions and intelligently organizing web pages based on insights from important interactions for better exploration and efficient management.

A web browser may be a software application for retrieving, presenting and traversing information resources on the World Wide Web. A web browser may further provide for the capture or input of information which may be returned to the presenting system, then stored or processed as necessary. The method of accessing a particular page or content is achieved by entering the web page's address, known as a uniform resource locator or URL. This may be a web page, image, video, or other piece of content. Hyperlinks present in resources enable users easily to navigate their browsers to related resources. A web browser can also be defined as an application software or program designed to enable users to access, retrieve and view documents and other resources on the Internet.

SUMMARY

Aspects of an embodiment of the present disclosure disclose an approach for detecting web browsing subject-oriented event interactions and intelligently organizing web pages based on insights from important interactions for better exploration and efficient management, a processor extracts time series data associated with a plurality of web browsing events based on browsing historical actions of a user. A processor identifies the subject of each web browsing event. A processor determines major events based on the time series data and subjects of the plurality of web browsing events. A processor organizes the plurality of web browsing events based on subject hierarchy and timeline from the time series data. A processor highlights one or more uniform resource locators based on the subject hierarchy and timeline.

DETAILED DESCRIPTION

The present disclosure is directed to systems and methods for detecting web browsing subject-oriented event interactions and intelligently organizing web pages based on insights from important interactions for better exploration and efficient management.

Embodiments of the present disclosure recognize a need for better user experience and resource management for current web browsers. For example, embodiments of the present disclosure recognize a need to find a target web page quickly and conveniently from a great number of the browsing/browsed web pages. Embodiments of the present disclosure recognize a need for the resource management when lots of web pages are open at the same time.

Embodiments of the present disclosure disclose systems and methods to detect web browsing subject-oriented event interactions and to intelligently organize web pages based on the insights from important interactions. Embodiments of the present disclosure disclose identifying and collecting web browsing subject-oriented events from user's browsing historical actions. Embodiments of the present disclosure disclose extracting event time series patterns to detect major subject-oriented events and least important events. Embodiments of the present disclosure disclose organizing major events based on subject hierarchy and timeline with the most important information highlighted. Embodiments of the present disclosure disclose recommending to automatically trigger the top less important events to be closed. Embodiments of the present disclosure disclose highlighting valuable subject-oriented insights in a hierarchy and timeline structure. Embodiments of the present disclosure disclose recommending a group of less important web pages to be closed to free computing resources. Embodiments of the present disclosure disclose detecting web browsing subject-oriented event interactions and organizing web pages well based on the insights from the most important interactions for better exploration and efficient management. Embodiments of the present disclosure disclose defining and generating web browsing subject-oriented events from user's browsing historical actions.

Figure 1:
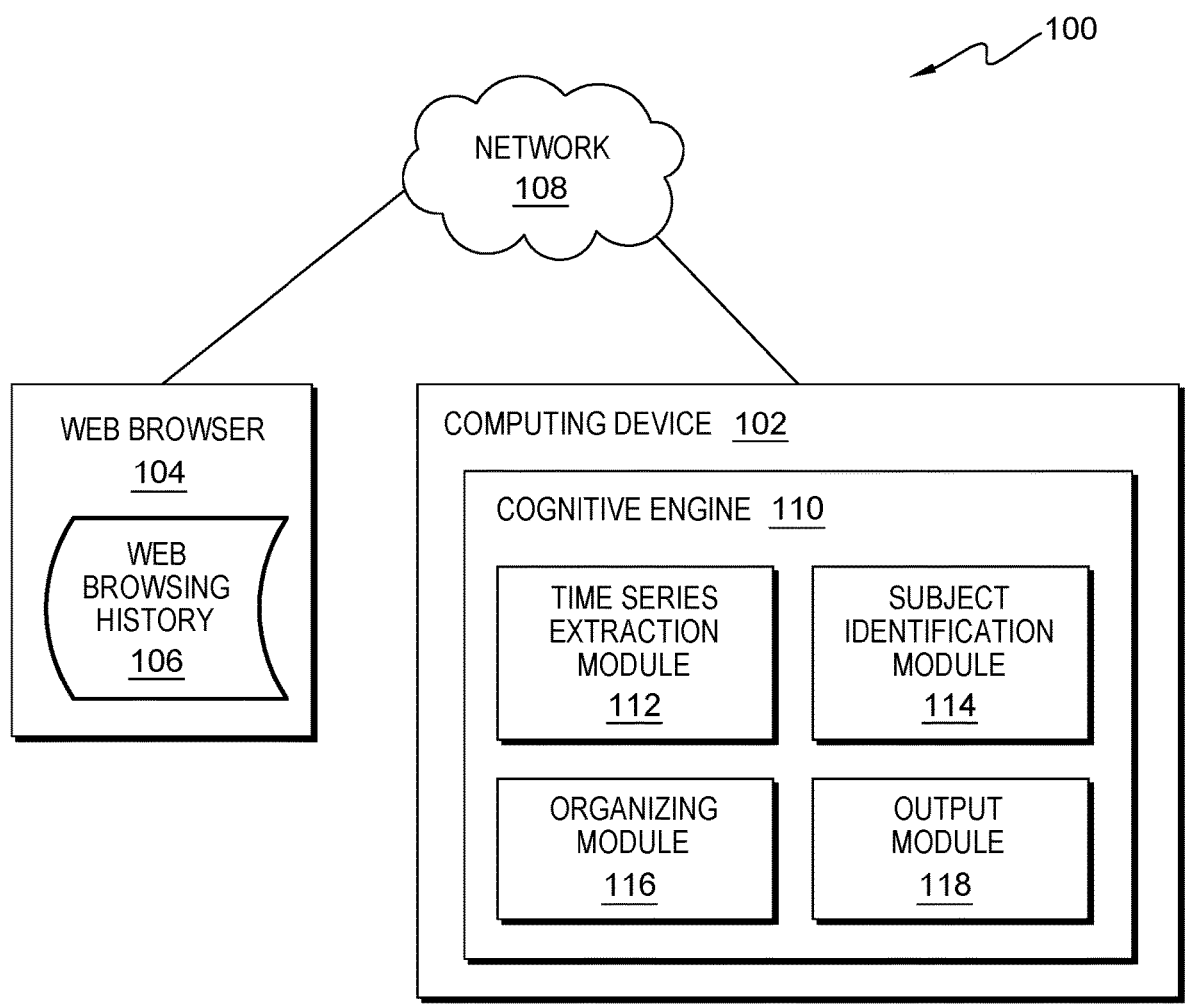
FIG. 1 is a functional block diagram illustrating a web page exploration and management environment, in accordance with an embodiment of the present disclosure.

The present disclosure will now be described in detail with reference to the Figures. FIG. 1 is a functional block diagram illustrating web page exploration and management environment, generally designated 100, in accordance with an embodiment of the present disclosure.

In the depicted embodiment, web page exploration and management environment 100 includes computing device 102, web browser 104, and network 108. In the depicted embodiment, web browser 104 is located externally and accessed through a communication network such as network 108. However, in other embodiments, web browser 104 may be located on computing device 102. In various embodiments of the present disclosure, web browser 104 may be application software for accessing the World Wide Web. Web browser 104 may be commonly referred as a browser. When a user requests a web page from a particular website, the web browser retrieves the necessary content from a web server and then displays the page on the user's device. Web browser 104 may be used on a range of devices, including desktops, laptops, tablets, and smartphones. For example, web browser 104 may be any suitable browser for accessing the World Wide Web. In the depicted embodiment, web browser 104 includes web browsing history 106. In the depicted embodiment, web browsing history 106 is located on web browser 104. However, in other embodiments, web browsing history 106 may be located externally and accessed through network 108. Web browsing history 106 may refer to the list of web pages a user has visited, as well as associated data such as page title and time of visit. Web browsing history 106 may be stored locally by web browser 104 to provide the user with a history list to go back to previously visited pages. Web browsing history 106 can reflect the user's interests, needs, and browsing habits. The user can disable this feature or must opt in to have their user information be obtained. The user is in control of what type of information is going to be collected and aware of how that information is going to be used. Web browser 104 may have a private browsing mode in which web browsing history 106 may not be recorded.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access cognitive engine 110 and network 108 and is capable of processing program instructions and executing cognitive engine 110, in accordance with an embodiment of the present disclosure. Computing device 102 may include internal and external hardware components, as depicted and described in further detail with respect to FIG. 7.

Further, in the depicted embodiment, computing device 102 includes cognitive engine 110. In the depicted embodiment, cognitive engine 110 is located on computing device 102. However, in other embodiments, cognitive engine 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and cognitive engine 110, in accordance with a desired embodiment of the disclosure.

In one or more embodiments, cognitive engine 110 is configured to extract time series data associated with a plurality of web browsing events based on browsing historical actions of a user. In general, time series analysis may comprise methods for analyzing time series data in order to extract meaningful statistics and other characteristics of the data. Time series forecasting is the use of a model to predict future values based on previously observed values. For example, cognitive engine 110 may extract time series data based on web browsing history in web browser 104. Cognitive engine 110 may define the plurality of web browsing events. Cognitive engine 110 may collect the time series data. The time series data may include start time of opening a web page, end time of closing the web page, duration of staying in the web page, and a subject of browsing the web page for each web browsing event. Cognitive engine 110 may determine web browsing subject-oriented events based on web browsing history in web browser 104. Cognitive engine 110 may collect data from user's browsing historical actions. For example, user's browsing historical actions may include, e.g., opening a web page, leaving or closing a web page, browsing a web page. Cognitive engine 110 may create subject-oriented events based on user's browsing activities. Cognitive engine 110 may extract event time series patterns to detect major subject-oriented events. For example, cognitive engine 110 may cluster event time series based on a subject with a strategy that a sub-subject of the subject may be merged into the related subject. Cognitive engine 110 may identify a major time slot for each clustered event. Cognitive engine 110 may organize major subjects by timeline. Cognitive engine 110 may detect web browsing subject-oriented event interactions and may organize web pages well based on the insights from the most important interactions for better exploration and efficient management. Cognitive engine 110 may define and generate web browsing subject-oriented events from user's browsing historied actions. Cognitive engine 110 may extract event time series patterns to detect major subject-oriented events and least important events. Cognitive engine 110 may build subject-oriented event time series and may identify the most important event interactions for web pages exploration and management.

In one or more embodiments, cognitive engine 110 is configured to identify a subject of each web browsing event. Cognitive engine 110 may identify key words in a uniform resource locator link, title, and content in a web page. Cognitive engine 110 may rank the key words based on the frequency of each key word among the uniform resource locator link, title, and content in the web page. Cognitive engine 110 may mark the most important key word as the subject of the web page. In an example, cognitive engine 110 may determine the most frequent key word as the subject. In another example, cognitive engine 110 may determine the subject of the web page based on the key words in other suitable methods. Cognitive engine 110 may determine major events based on the time series data and subjects of the web browsing events. Cognitive engine 110 may learn the subject of browsing the web page and may merge similar ones. Cognitive engine 110 may analyze the relations among the uniform resource locator, title, and content in a web page. Cognitive engine 110 may find a user's habit by applying machine learning on user historical behaviors. Cognitive engine 110 may then provide useful and interactive user experience. Cognitive engine 110 may identify important event interactions with timeline to find high value insights from user's browsing subject and may track for smart and efficient web pages exploration and management.

In one or more embodiments, cognitive engine 110 is configured to organize the plurality of web browsing events based on subject hierarchy and timeline from the time series data. Cognitive engine 110 may organize major events based on subject hierarchy and timeline with important information highlighted. Cognitive engine 110 may build event hierarchical tree relations and may organize the web browsing events as a tree structure. Cognitive engine 110 may leverage a hierarchical relation in uniform resource locators. Cognitive engine 110 may utilize the relation of one subject key word containing another subject. Cognitive engine 110 may determine subject inclusion relations by leveraging hierarchical relation in uniform resource locators and utilizing the relation of one subject key word containing another subject key word.

In one or more embodiments, cognitive engine 110 is configured to highlight one or more uniform resource locators based on the subject hierarchy and timeline based on time series data. Cognitive engine 110 may recommend less important events to be closed automatically. Cognitive engine 110 may output useful subject-oriented insights highlighted in a hierarchy and timeline structure. Cognitive engine 110 may recommend a group of less important opening events (e.g., less used web pages) to be closed automatically to free computing resources. Cognitive engine 110 may highlight high value information in the hierarchy tree and timeline structure for efficient management. Cognitive engine 110 may highlight the top important sub-subjects. In each leaf node, cognitive engine 110 may highlight the most important uniform resource locator for a quick search and view. Cognitive engine 110 may maintain the less important events (web pages) but does not display the less important web pages by default. Cognitive engine 110 may pop up the top unimportant events for a user to confirm to close. Cognitive engine 110 may trigger popping up the top unimportant events when the number of the opened webpages exceed a predefined tolerance threshold. Cognitive engine 110 may allow a user to close the unimportant web pages in a batch. Cognitive engine 110 may provide the smart exploration and management for the opened web pages that can fill the gap in the current browsers by extracting high value insights based on browsing purpose/subject and timeline. Cognitive engine 110 may highlight the most important information with an appropriate organization for an efficient exploration. Cognitive engine 110 may intelligently recommend closing less important events (e.g., less used and opened web pages) to free computing resources.

Further, in the depicted embodiment, cognitive engine 110 includes time series extraction module 112, subject identification module 114, organizing module 116, and output module 118. In the depicted embodiment, time series extraction module 112, subject identification module 114, organizing module 116, and output module 118 are located on computing device 102 and cognitive engine 110. However, in other embodiments, time series extraction module 112, subject identification module 114, organizing module 116, and output module 118 may be located externally and accessed through a communication network such as network 108. In one or more embodiments, time series extraction module 112 is configured to extract time series data associated with a plurality of web browsing events based on browsing historical actions of a user. In general, time series analysis may comprise methods for analyzing time series data in order to extract meaningful statistics and other characteristics of the data. Time series forecasting is the use of a model to predict future values based on previously observed values. For example, time series extraction module 112 may extract time series data based on web browsing history in web browser 104. Time series extraction module 112 may define the plurality of web browsing events. Time series extraction module 112 may collect the time series data. The time series data may include start time of opening a web page, end time of closing the web page, duration of staying in the web page, and a subject of browsing the web page for each web browsing event. Time series extraction module 112 may determine web browsing subject-oriented events based on web browsing history in web browser 104. Time series extraction module 112 may collect data from user's browsing historical actions. For example, user's browsing historical actions may include, e.g., opening a web page, leaving or closing a web page, browsing a web page. Time series extraction module 112 may create subject-oriented events based on user's browsing activities. Time series extraction module 112 may extract event time series patterns to detect major subject-oriented events. For example, time series extraction module 112 may cluster event time series based on a subject with a strategy that a sub-subject of the subject may be merged into the related subject. Time series extraction module 112 may identify a major time slot for each clustered event. Time series extraction module 112 may organize major subjects by timeline. Time series extraction module 112 may detect web browsing subject-oriented event interactions and organize web pages well based on the insights from the most important interactions for better exploration and efficient management. Time series extraction module 112 may define and generate web browsing subject-oriented events from user's browsing historied actions. Time series extraction module 112 may extract event time series patterns to detect major subject-oriented events and least important events. Time series extraction module 112 may build subject-oriented event time series and may identify the most important event interactions for web pages exploration and management.

In one or more embodiments, subject identification module 114 is configured to identify a subject of each web browsing event. Subject identification module 114 may identify key words in a uniform resource locator link, title, and content in a web page. Subject identification module 114 may rank the key words based on the frequency of each key word among the uniform resource locator link, title, and content in the web page. Subject identification module 114 may mark the most important key word as the subject of the web page. In an example, subject identification module 114 may determine the most frequent key word as the subject. In another example, subject identification module 114 may determine the subject of the web page based on the key words in other suitable methods. Subject identification module 114 may determine major events based on the time series data and subjects of the web browsing events. Subject identification module 114 may learn the subject of browsing the web page and may merge similar ones. Subject identification module 114 may analyze the relations among the uniform resource locator, title, and content in a web page. Subject identification module 114 may find a user's habit by applying machine learning on user historical behaviors. Subject identification module 114 may then provide useful and interactive user experience. Subject identification module 114 may identify important event interactions with timeline to find high value insights from user's browsing subject and may track for smart and efficient web pages exploration and management.

In one or more embodiments, organizing module 116 is configured to organize the plurality of web browsing events based on subject hierarchy and timeline from the time series data. Organizing module 116 may organize major events based on subject hierarchy and timeline with important information highlighted. Organizing module 116 may build event hierarchical tree relations and may organize the web browsing events as a tree structure. Organizing module 116 may leverage a hierarchical relation in uniform resource locators. Organizing module 116 may utilize the relation of one subject key word containing another subject. Organizing module 116 may determine subject inclusion relations by leveraging hierarchical relation in uniform resource locators and utilizing the relation of one subject key word containing another subject key word.

In one or more embodiments, output module 118 is configured to highlight one or more uniform resource locators based on the subject hierarchy and timeline based on time series data. Output module 118 may recommend less important events to be closed automatically. Output module 118 may output useful subject-oriented insights highlighted in a hierarchy and timeline structure. Output module 118 may recommend a group of less important opening events (e.g., less used web pages) to be closed automatically to free computing resources. Output module 118 may highlight high value information in the hierarchy tree and timeline structure for efficient management. Output module 118 may highlight the top important sub-subjects. In each leaf node, output module 118 may highlight the most important uniform resource locator for a quick search and view. Output module 118 may maintain the less important events (web pages) but does not display the less important web pages by default. Output module 118 may pop up the top unimportant events for a user to confirm to close. Output module 118 may trigger popping up the top unimportant events when the opened webpages exceed a predefined tolerance threshold. Output module 118 may allow a user to close the unimportant web pages in a batch. Output module 118 may provide the smart exploration and management for the opened web pages that can fill the gap in the current browsers by extracting high value insights based on browsing purpose/subject and timeline. Output module 118 may highlight the most important information with an appropriate organization for an efficient exploration. Output module 118 may intelligently recommend closing less important events (e.g., less used and opened web pages) to free computing resources.

Figure 2:
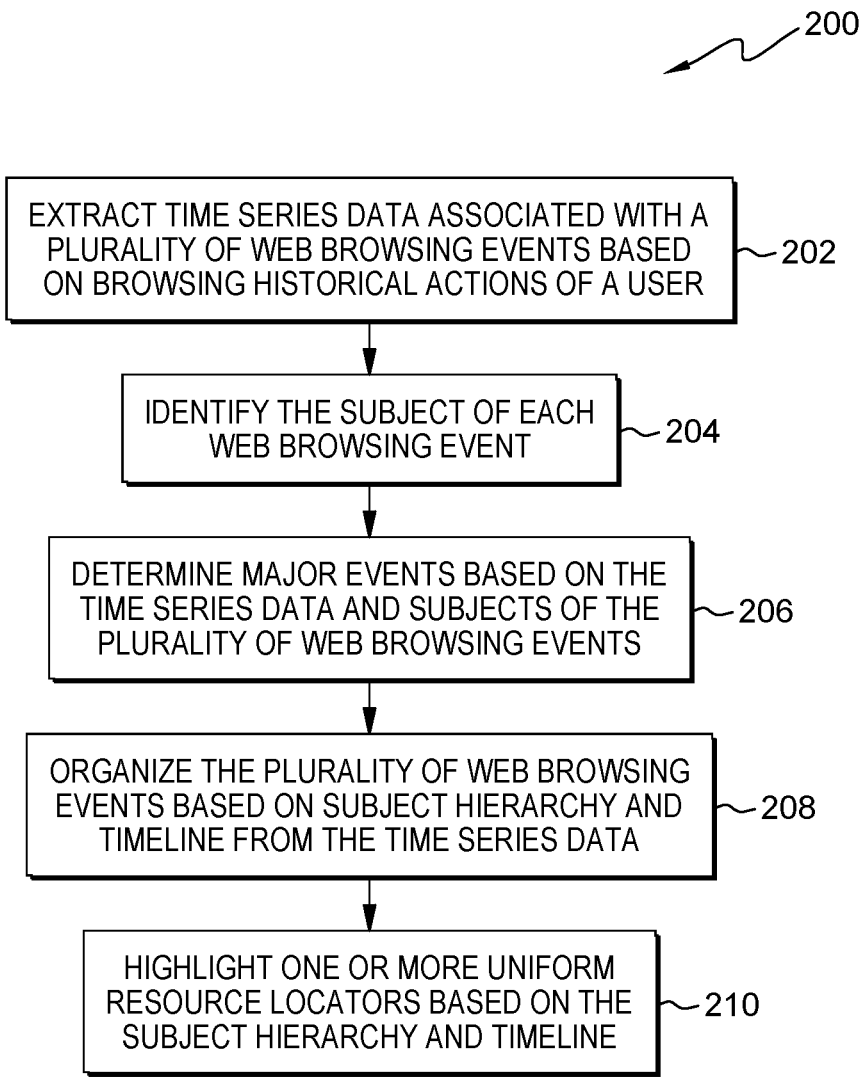
FIG. 2 is a flowchart depicting operational steps of a cognitive engine 110 within a computing device of FIG. 1, in accordance with an embodiment of the present disclosure.

FIG. 2 is a flowchart 200 depicting operational steps of cognitive engine 110 in accordance with an embodiment of the present disclosure.

Cognitive engine 110 operates to extract time series data associated with a plurality of web browsing events based on browsing historical actions of a user. Cognitive engine 110 also operates to identify a subject of each web browsing event. Cognitive engine 110 operates to determine major events based on the time series data and subjects of the web browsing events. Cognitive engine 110 also operates to organize the plurality of web browsing events based on subject hierarchy and timeline from the time series data. Cognitive engine 110 also operates to highlight one or more uniform resource locators based on the subject hierarchy and timeline based on time series data.

In step 202, cognitive engine 110 extracts time series data associated with a plurality of web browsing events based on browsing historical actions of a user. In general, time series analysis may comprise methods for analyzing time series data in order to extract meaningful statistics and other characteristics of the data. Time series forecasting is the use of a model to predict future values based on previously observed values. For example, cognitive engine 110 may extract time series data based on web browsing history in web browser 104. Cognitive engine 110 may define the plurality of web browsing events. Cognitive engine 110 may collect the time series data. The time series data may include start time of opening a web page, end time of closing the web page, duration of staying in the web page, and a subject of browsing the web page for each web browsing event. Cognitive engine 110 may determine web browsing subject-oriented events based on web browsing history in web browser 104. Cognitive engine 110 may collect data from user's browsing historical actions. For example, user's browsing historical actions may include, e.g., opening a web page, leaving or closing a web page, browsing a web page. Cognitive engine 110 may create subject-oriented events based on user's browsing activities. Cognitive engine 110 may extract event time series patterns to detect major subject-oriented events. For example, cognitive engine 110 may cluster event time series based on a subject with a strategy that a sub-subject of the subject may be merged into the related subject. Cognitive engine 110 may identify a major time slot for each clustered event. Cognitive engine 110 may organize major subjects by timeline. Cognitive engine 110 may detect web browsing subject-oriented event interactions and organize web pages well based on the insights from the most important interactions for better exploration and efficient management. Cognitive engine 110 may define and generate web browsing subject-oriented events from user's browsing historied actions. Cognitive engine 110 may extract event time series patterns to detect major subject-oriented events and least important events. Cognitive engine 110 may build subject-oriented event time series and may identify the most important event interactions for web pages exploration and management.

In step 204, cognitive engine 110 identifies a subject of each web browsing event. Cognitive engine 110 may identify key words in a uniform resource locator link, title, and content in a web page. Cognitive engine 110 may rank the key words based on the frequency of each key word among the uniform resource locator link, title, and content in the web page. Cognitive engine 110 may mark the most important key word as the subject of the web page. In an example, cognitive engine 110 may determine the most frequent key word as the subject. In another example, cognitive engine 110 may determine the subject of the web page based on the key words in other suitable methods.

In step 206, cognitive engine 110 determines major events based on the time series data and subjects of the web browsing events. Cognitive engine 110 may learn the subject of browsing the web page and may merge similar ones. Cognitive engine 110 may analyze the relations among the uniform resource locator, title, and content in a web page. Cognitive engine 110 may find a user's habit by applying machine learning on user historical behaviors. Cognitive engine 110 may then provide useful and interactive user experience. Cognitive engine 110 may identify important event interactions with timeline to find high value insights from user's browsing subject and may track for smart and efficient web pages exploration and management.

In step 208, cognitive engine 110 organizes the plurality of web browsing events based on subject hierarchy and timeline from the time series data. Cognitive engine 110 may organize major events based on subject hierarchy and timeline with important information highlighted. Cognitive engine 110 may build event hierarchical tree relations and may organize the web browsing events as a tree structure. Cognitive engine 110 may leverage a hierarchical relation in uniform resource locators. Cognitive engine 110 may utilize the relation of one subject key word containing another subject. Cognitive engine 110 may determine subject inclusion relations by leveraging hierarchical relation in uniform resource locators and utilizing the relation of one subject key word containing another subject key word.

In step 210, cognitive engine 110 highlights one or more uniform resource locators based on the subject hierarchy and timeline based on time series data. Cognitive engine 110 may recommend less important events to be closed automatically. Cognitive engine 110 may output useful subject-oriented insights highlighted in a hierarchy and timeline structure. Cognitive engine 110 may recommend a group of less important opening events (e.g., less used web pages) to be closed automatically to free computing resources. Cognitive engine 110 may highlight high value information in the hierarchy tree and timeline structure for efficient management. Cognitive engine 110 may highlight the top important sub-subjects. In each leaf node, cognitive engine 110 may highlight the most important uniform resource locator for a quick search and view. Cognitive engine 110 may maintain the less important events (web pages) but does not display the less important web pages by default. Cognitive engine 110 may pop up the top unimportant events for a user to confirm to close. Cognitive engine 110 may trigger popping up the top unimportant events when the opened webpages exceed a predefined tolerance threshold. Cognitive engine 110 may allow a user to close the unimportant web pages in a batch. Cognitive engine 110 may provide the smart exploration and management for the opened web pages that can fill the gap in the current browsers by extracting high value insights based on browsing purpose/subject and timeline. Cognitive engine 110 may highlight the most important information with an appropriate organization for an efficient exploration. Cognitive engine 110 may intelligently recommend closing less important events (e.g., less used and opened web pages) to free computing resources.

Figure 3:
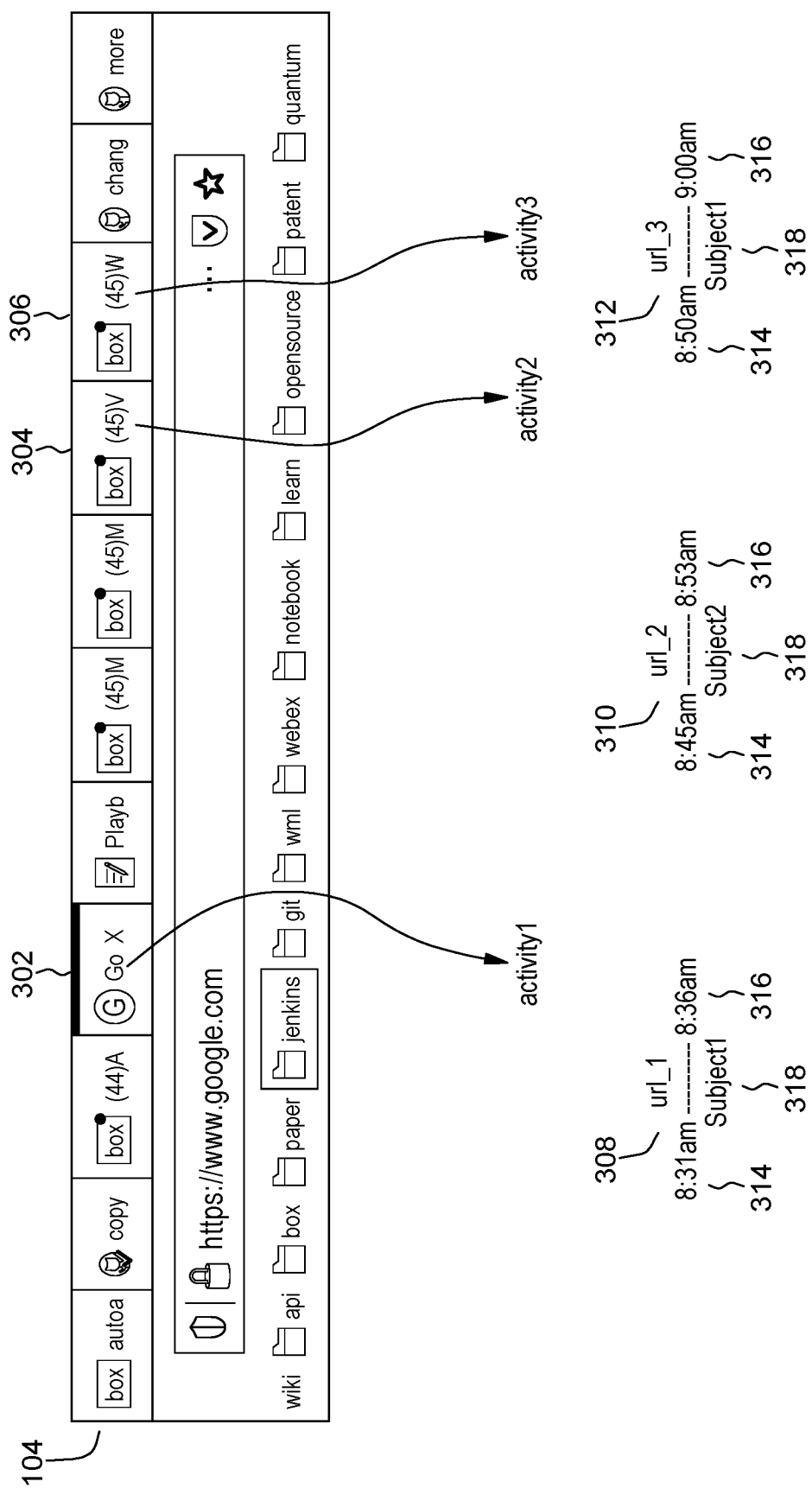
FIG. 3 illustrates an exemplary functional diagram of a web browser and the cognitive engine in the computing device of FIG. 1, in accordance with an embodiment of the present disclosure.

FIG. 3 illustrates an exemplary functional diagram of web browser 104 and cognitive engine 110 in computing device 102, in accordance with an embodiment of the present disclosure.

In the example of FIG. 3, cognitive engine 110 may determine web browsing subject-oriented events from user's browsing activities, e.g., 302, 304, 306, in web browser 104. Cognitive engine 110 may collect the time series data 308, 310, 312. The time series data may include start time 314 of opening a web page, end time 316 of leaving/closing the web page, duration of staying in the web page, and subject 318 of browsing the web page for each web browsing event. For example, user's browsing historical actions may include, e.g., opening a web page, leaving or closing a web page, browsing a web page. Cognitive engine 110 may create subject-oriented events based on user's browsing activities 302, 304, 306. Cognitive engine 110 may extract event time series patterns to detect major subject-oriented events.

Figure 4:
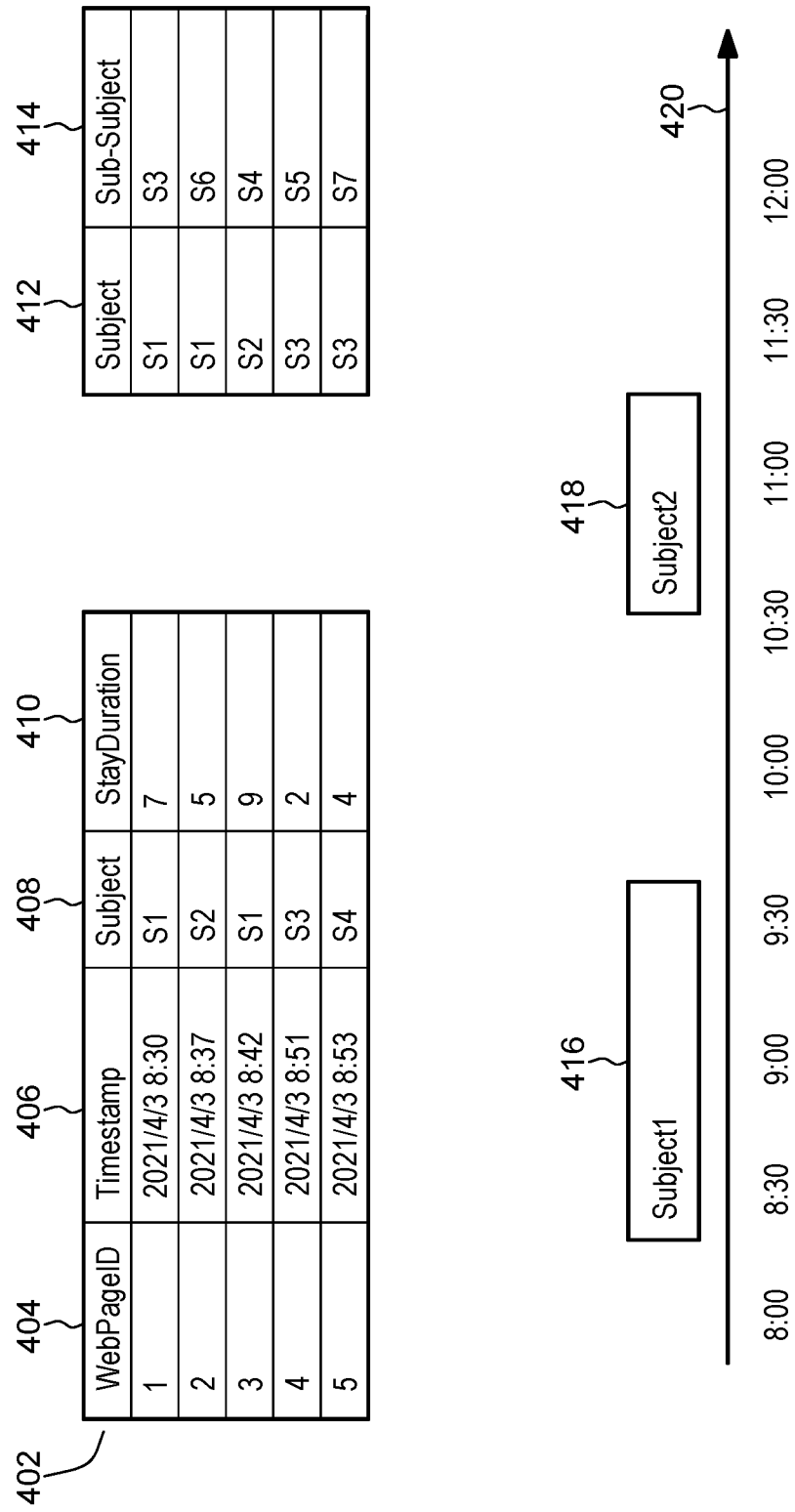
FIG. 4 illustrates exemplary functional tables and timeline of extracting time series data with the cognitive engine in the computing device of FIG. 1, in accordance with an embodiment of the present disclosure.

FIG. 4 illustrates exemplary functional tables and timeline of extracting time series data with cognitive engine 110 in computing device 102, in accordance with an embodiment of the present disclosure.

In the example of FIG. 4, cognitive engine 110 may extract time series data 402 associated with a plurality of web browsing events based on browsing historical actions of a user. Cognitive engine 110 may extract time series data 402 based on web browsing history in web browser 104. Time series data 402 may include web page ID 404, timestamp 406 (e.g., start time) of opening each web page, duration 410 of staying in the web page, and subject 408 of browsing the web page for each web browsing event. Cognitive engine 110 may determine web browsing subject-oriented events based on web browsing history in web browser 104. Cognitive engine 110 may cluster event time series based on subject 408, 412 with a strategy that sub-subject 414 of subject 412 may be merged into the related subject. Cognitive engine 110 may identify a major time slot for each clustered event (e.g., 416, 418). Cognitive engine 110 may organize major subjects 416, 418 by timeline 420.

Figure 5:
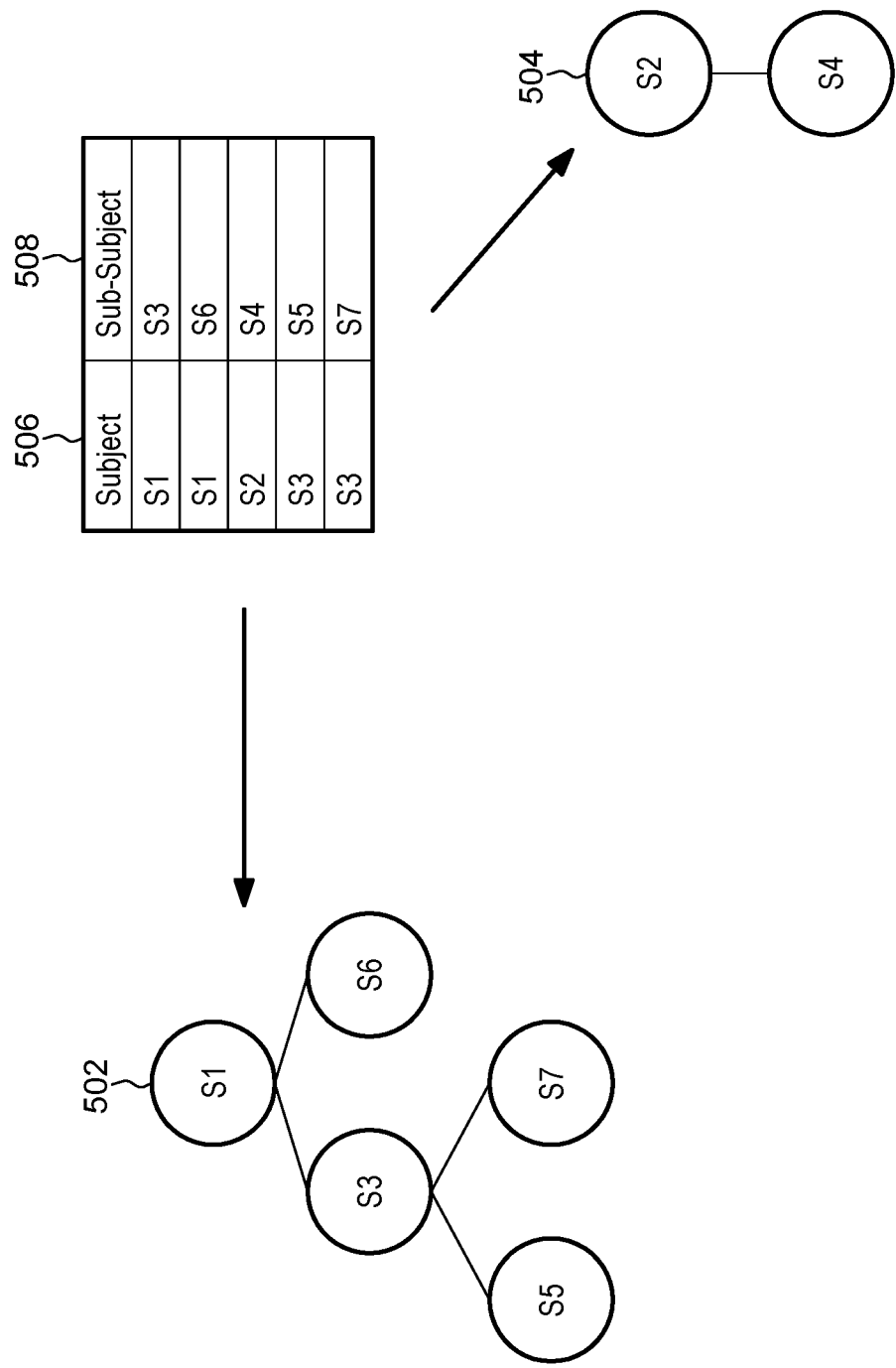
FIG. 5 illustrates an exemplary functional diagram of the cognitive engine in the computing device of FIG. 1, in accordance with an embodiment of the present disclosure.

FIG. 5 illustrates an exemplary functional diagram of cognitive engine 110, in accordance with an embodiment of the present disclosure.

In the example of FIG. 5, cognitive engine 110 may organize web browsing events based on subject hierarchy and timeline. Cognitive engine 110 may build event hierarchical tree relations 502, 504. Cognitive engine 110 may utilize the relation of one subject 506 containing another subject (sub-subject 508). Cognitive engine 110 may determine subject inclusion relations by leveraging hierarchical relation in uniform resource locators and utilizing the relation of one subject key word containing another subject key word.

Figure 6:
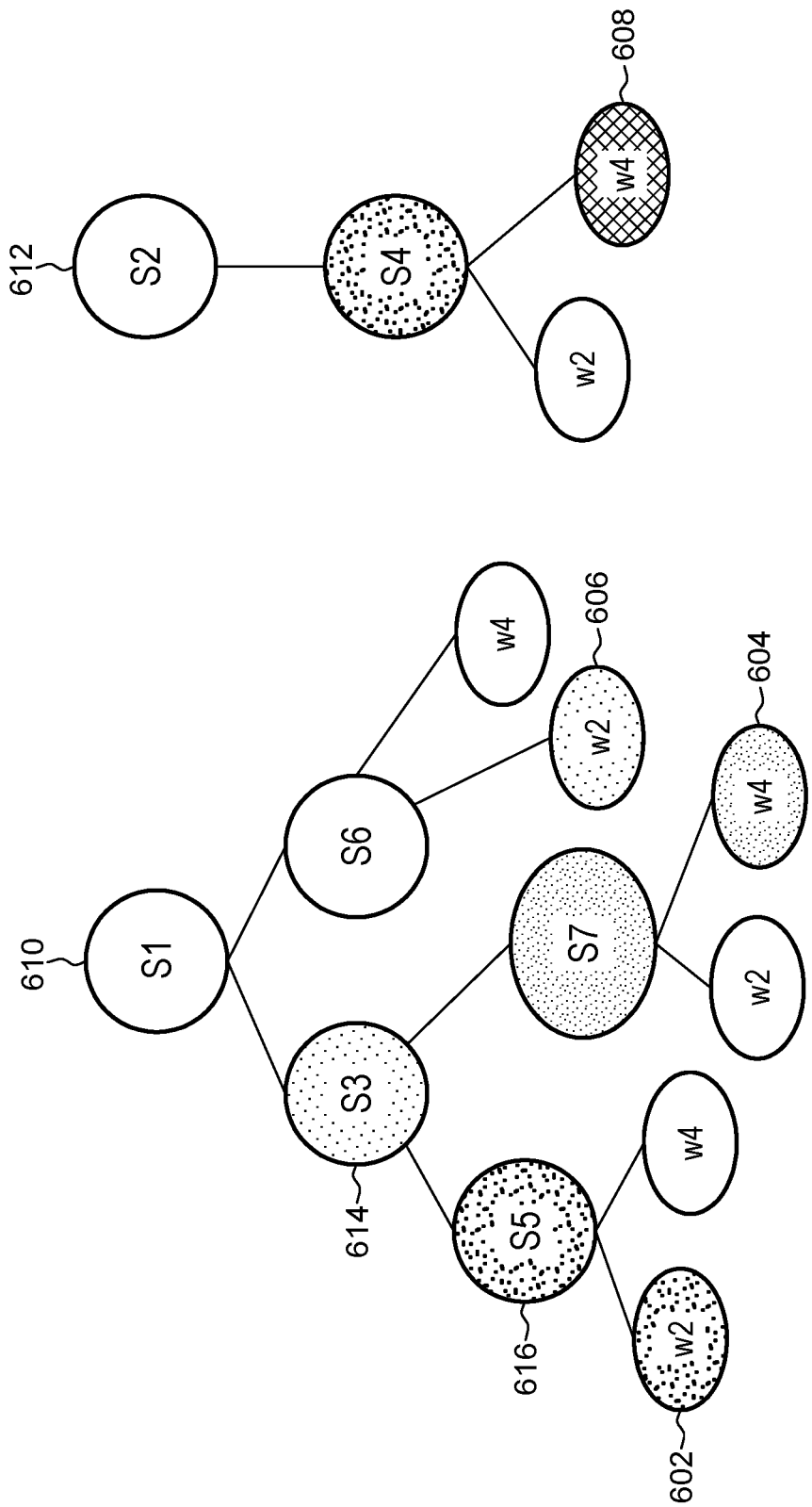
FIG. 6 illustrates an exemplary functional diagram of the cognitive engine in the computing device of FIG. 1, in accordance with an embodiment of the present disclosure.

FIG. 6 illustrates an exemplary functional diagram of cognitive engine 110, in accordance with an embodiment of the present disclosure.

In the example of FIG. 6, cognitive engine 110 may highlight one or more uniform resource locators 602, 604, 606, 608 based on subject hierarchy 610, 612 and timeline 420. Cognitive engine 110 may highlight the top important sub-subjects (e.g., 614, 616). In each leaf node, cognitive engine 110 may highlight the most important uniform resource locator (e.g., 602) for a quick search and view. Cognitive engine 110 may provide the smart exploration and management for the opened web pages that can fill the gap in the current browsers by extracting high value insights based on browsing purpose/subject and timeline. Cognitive engine 110 may highlight the most important information with an appropriate organization for an efficient exploration. Cognitive engine 110 may intelligently recommend closing less important events (e.g., less used and opened web pages) to free computing resources.

Figure 7:
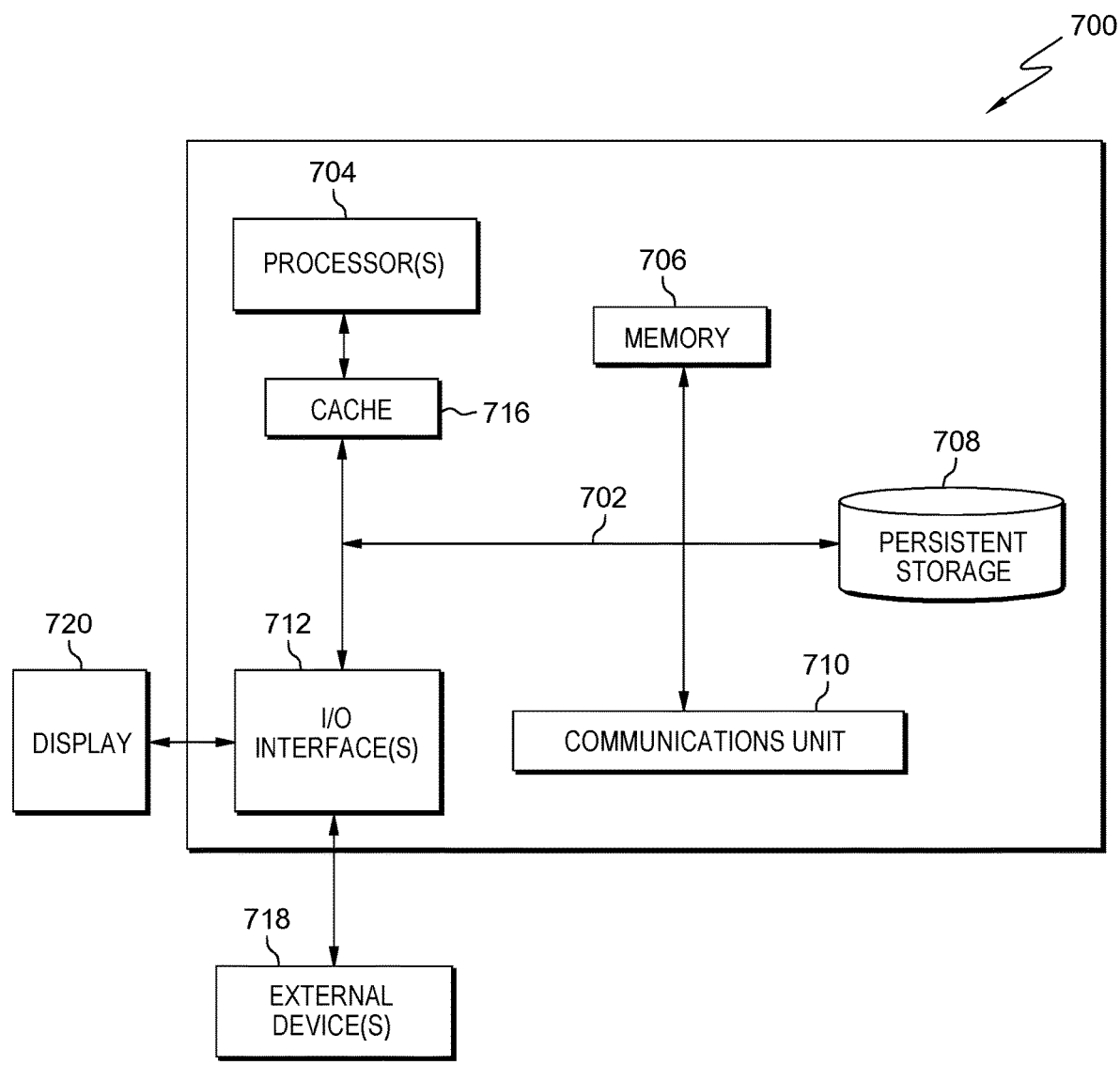
FIG. 7 is a block diagram of components of the computing device of FIG. 1, in accordance with an embodiment of the present disclosure.

FIG. 7 depicts a block diagram 700 of components of computing device 102 in accordance with an illustrative embodiment of the present disclosure. It should be appreciated that FIG. 7 provides only an illustration of one implementation and does not imply any limitations with regard to the environments in which different embodiments may be implemented. Many modifications to the depicted environment may be made.

Computing device 102 may include communications fabric 702, which provides communications between cache 716, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a crossbar switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of computer processor(s) 704 by holding recently accessed data, and data near accessed data, from memory 706.

Cognitive engine 110 may be stored in persistent storage 708 and in memory 706 for execution by one or more of the respective computer processors 704 via cache 716. In an embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Cognitive engine 110 may be downloaded to persistent storage 708 through communications unit 710.

I/O interface(s) 712 allows for input and output of data with other devices that may be connected to computing device 102. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention, e.g., cognitive engine 110 can be stored on such portable computer readable storage media and can be loaded onto persistent storage 708 via I/O interface(s) 712. I/O interface(s) 712 also connect to display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
    extracting, by one or more processors, time series data associated with a plurality of web browsing events based on browsing historical actions of a user;
    identifying, by one or more processors, a subject of each web browsing event;
    analyzing, by one or more processors, the historical actions of the user to identify one or more user habits corresponding to the identified subjects of the plurality of web browsing events:
    determining, by one or more processors, a subject hierarchy and one or more major events based, at least in part, on the one or more user habits, the time series data and the subjects of the plurality of web browsing events;
    training, by one or more processors, a cognitive engine based, at least in part, on the one or more user habits and the determined subject hierarchy;
    organizing, by one or more processors, the plurality of web browsing events based on the subject hierarchy and a timeline from the time series data; and
    highlighting, by one or more processors, one or more uniform resource locators based on the subject hierarchy and the timeline.

2. The computer-implemented method of claim 1, wherein extracting the time series data comprises defining the plurality of web browsing events based on the browsing historical actions of the user, wherein the time series data includes start time of opening a web page, end time of closing the web page, duration of staying in the web page, and a subject of browsing the web page for each web browsing event.

3. The computer-implemented method of claim 2, wherein extracting the time series data comprises collecting the time series data based on the browsing historical actions of the user.

4. The computer-implemented method of claim 1, wherein identifying the subject comprises:
    identifying key words in a uniform resource locator link, title, and content in a web page;
    ranking the key words based on a frequency of each key word; and
    determining the most frequent key word as the subject.

5. The computer-implemented method of claim 1, wherein organizing the plurality of web browsing events comprises building a hierarchical relation and organizing the web browsing events as a tree structure.

6. The computer-implemented method of claim 5, further comprising:
    leveraging the hierarchical relation in uniform resource locators; and
    utilizing the hierarchical relation of one subject key word containing another subject.

7. The computer-implemented method of claim 1, further comprising:
    determining, by one or more processors, that a threshold number of active events is currently met; and
    responsive to determining that the threshold number of active events is currently met,
    recommending less important events to be automatically closed.

8. A computer program product comprising:
    one or more computer readable storage media, and program instructions collectively stored on the one or more computer readable storage media, the program instructions comprising:
    program instructions to extract time series data associated with a plurality of web browsing events based on browsing historical actions of a user;
    program instructions to identify a subject of each web browsing event;
    program instructions to analyze the historical actions of the user to identify one or more user habits corresponding to the identified subjects of the plurality of web browsing events;
    program instructions to determine a subject hierarchy and one or more major events based, at least in part, on the one or more user habits, the time series data and the subjects of the plurality of web browsing events;
    program instructions to train a cognitive engine based, at least in part, on the one or more user habits and the determined subject hierarchy;

program instructions to organize the plurality of web browsing events based on the subject hierarchy and a timeline from the time series data; and program instructions to highlight one or more uniform resource locators based on the subject hierarchy and the timeline.

9. The computer program product of claim 8, wherein program instructions to extract the time series data comprise program instructions to define the plurality of web browsing events based on the browsing historical actions of the user, wherein the time series data includes start time of opening a web page, end time of closing the web page, duration of staying in the web page, and a subject of browsing the web page for each web browsing event.

10. The computer program product of claim 9, wherein program instructions to extract the time series data comprise program instructions to collect the time series data based on the browsing historical actions of the user.

11. The computer program product of claim 8, wherein program instructions to identify the subject comprise:
    program instructions to identify key words in a uniform resource locator link, title, and content in a web page;
    program instructions to rank the key words based on a frequency of each key word; and
    program instructions to determine the most frequent key word as the subject.

12. The computer program product of claim 8, wherein program instructions to organize the plurality of web browsing events comprise program instructions to build a hierarchical relation and to organize the web browsing events as a tree structure.

13. The computer program product of claim 12, further comprising:
    program instructions to leverage the hierarchical relation in uniform resource locators; and
    program instructions to utilize the hierarchical relation of one subject key word containing another subject.

14. The computer program product of claim 8, further comprising:
    program instructions to determine that a threshold number of active events is currently met; and
    program instructions to recommend less important events to be automatically closed responsive to determining that the threshold number of active events is currently met.

15. A computer system comprising:
    one or more computer processors, one or more computer readable storage media, and program instructions stored on the one or more computer readable storage media for execution by at least one of the one or more computer processors, the program instructions comprising:
        program instructions to extract time series data associated with a plurality of web browsing events based on browsing historical actions of a user;
        program instructions to identify a subject of each web browsing event;
        program instructions to analyze the historical actions of the user to identify one or more user habits corresponding to the identified subjects of the plurality of web browsing events:
        program instructions to determine a subject hierarchy and one or more major events based, at least in part, on the one or more user habits, the time series data and the subjects of the plurality of web browsing events;
        program instructions to train a cognitive engine based, at least in part, on the one or more user habits and the determined subject hierarchy;
        program instructions to organize the plurality of web browsing events based on the subject hierarchy and a timeline from the time series; and
        program instructions to highlight one or more uniform resource locators based on the subject hierarchy and the timeline.

16. The computer system of claim 15, wherein program instructions to extract the time series data comprise program instructions to define the plurality of web browsing events based on the browsing historical actions of the user, wherein the time series data includes start time of opening a web page, end time of closing the web page, duration of staying in the web page, and a subject of browsing the web page for each web browsing event.

17. The computer system of claim 16, wherein program instructions to extract the time series data comprise program instructions to collect the time series data based on the browsing historical actions of the user.

18. The computer system of claim 15, wherein program instructions to identify the subject comprise:
    program instructions to identify key words in a uniform resource locator link, title, and content in a web page;
    program instructions to rank the key words based on a frequency of each key word; and
    program instructions to determine the most frequent key word as the subject.

19. The computer system of claim 15, wherein program instructions to organize the plurality of web browsing events comprise program instructions to build a hierarchical relation and to organize the web browsing events as a tree structure.

20. The computer system of claim 19, further comprising:
    program instructions to leverage the hierarchical relation in uniform resource locators; and
    program instructions to utilize the hierarchical relation of one subject key word containing another subject.

* * * * *